3,330,828
POLYMERIZATION OF POLYISOCYANATES
Gerhard Grogler and Erwin Windemuth, Leverkusen, Germany, assignors to Farbenfabriken Bayer Aktiengesellschaft, Leverkusen, Germany, a corporation of Germany
No Drawing. Filed Apr. 13, 1965, Ser. No. 447,876
Claims priority, application Germany, Apr. 20, 1964, F 42,671
17 Claims. (Cl. 260—248)

This invention relates to a process for preparing polyisocyanates and more particularly to a process for preparing polyisocyanates having an isocyanurate structure.

German patent specification 951,161 describes a process for preparing polyisocyanates containing an isocyanurate structure by the polymerization of monomeric organic polyisocyanates having at least one isocyanate group linked to an aromatic ring with themselves or in admixture with monofunctional aromatic isocyanates in the presence of strongly basic tertiary and aliphatic amines.

In addition, British patent specification 809,809 describes the preparation of polymeric polyisocyanates containing an isocyanurate structure in the presence of basically reacting catalytic compounds such as alkali metal and alkaline earth metal oxides, hydroxides, carbonates, alcoholates or phenolates, alkali metal salts of carboxylic acids or of enolisable compounds and metal salts of weak aliphatic or alicyclic carboxylic acids. However, all of the above catalysts have a common characteristic, namely a metal to oxygen linkage.

Salts of compounds having at least two nitrogen atoms which are capable of being tautomerised, along with salts of cyanamide derivatives and of amidines, have been used as polymerization catalysts for the production of such isocyanates. However, even using these catalysts, long reaction times and relatively low yields of desirable polymerization products are obtained.

The prior art processes for making polyisocyanates containing an isocyanurate structure have been characterized by relatively high temperatures, long reaction times and low yields. Heretofore, isocyanates were polymerized in the presence of these known catalysts at elevated temperatures, which produced a product having a random number of free isocyanates in the molecule. These catalysts have the further disadvantage that it was difficult to conduct the polymerization in such a manner that reproducible products could be obtained. Another disadvantage of the catalysts heretofore used were their relative inefficiency in the polymerization of the isocyanates.

It is, therefore, an object of this invention to provide a novel process for the production of polymeric polyisocyanates. Another object of this invention is to prepare polymeric polyisocyanates containing an isocyanurate structure. Still another object of this invention is to provide a more efficient and convenient process for the production of polymeric polyisocyanates. A further object of this invention is to provide a process for the production of polymeric polyisocyanates which are useful in the production of stable coatings, adhesives and the like. A still further object of this invention is to provide an economical process for the formation of polymeric polyisocyanates. Yet a further object of this invention is to provide polymeric polyisocyanates of reproducible composition.

The foregoing objects and others are accomplished in accordance with this invention, generally speaking, by providing a process for making polyisocyanates containing an isocyanurate structure as represented below,

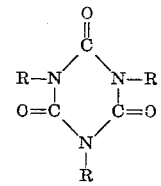

wherein R is an organic substituent which may or may not carry an NCO group, by polymerizing organic isocyanates in the presence of a catalytic amount of an N-alkali metal and/or N-alkaline earth metal compounds of amines or carboxylic acid amides.

The present invention is based on the discovery that these novel catalysts are far superior to the catalysts heretofore known in the art, such as strongly basic tertiary amines, and that organic isocyanates will readily polymerize in the presence of these catalysts to form higher molecular weight polyisocyanates having an isocyanurate structure even at room temperature. Polymerization of the isocyanate usually results in higher molecular weight polyisocyanates having one or more isocyanurate rings and containing free NCO groups. It has also been found that the efficiency of the catalysts in the polymerization process is greatly enhanced in the presence of N-substituted carbamic acid esters and solvents which contain reactive carbonyl groups.

Any aliphatic, cycloaliphatic and aromatic isocyanate may be used in the process of this invention such as, for example, tetramethylene diisocyanate, hexamethylene diisocyanate, m- or p-xylylene diisocyanate, dicyclohexyl-4,4'-methane diisocyanate, cyclohexane-1,3- and cyclohexane-1,4-diisocyanate and 1-methyl cyclohexane-2,4-diisocyanate. Aromatic polyisocyanates can also be used, such as 1,3- and 1,4-diisocyanatobenzene, 2,4- and 2,6-diisocyanato toluene, as well as any arbitrary isomer mixtures of these two latter, 4,4'-diisocyanato diphenyl methane, 1,5-diisocyanato naphthalene, 4,4'-diisocyanato diphenyl ether, 2,4,6-triisocyanato toluene, 4,4',4''-triisocyanato triphenyl methane, phosphoric acid-tris-(4-isocyanatophenyl ester) and 1-methyl-2,4-diisocyanato-3,5,6-trichlorobenzene.

These isocyanates can be polymerized either alone or in admixture with other isocyanates to form the polymeric polyisocyanates. Other isocyanates which may be combined with the polyisocyanates are the aliphatic, araliphatic or aromatic monoisocyanates such as, for example, methylisocyanate, ethylisocyanate, propylisocyanate, isopropylisocyanate, allylisocyanate, butylisocyanate, amylisocyanate, tetradecylisocyanate, dodecylisocyanate, hexadecylisocyanate, octadecylisocyanate, phenylisocyanate, cyclohexylisocyanate, o-chlorophenylisocyanate, m-chlorophenylisocyanate, p-chlorophenylisocyanate, o-ethylphenylisocyanate, benzylisocyanate, naphthylisocyanate and the like. These monoisocyanates can be combined with the polyisocyanates before or during polymerization to form higher molecular weight polyisocyanates having an isocyanurate structure and having fewer NCO groups per molecule. It is beneficial in the preparation of these copolymers to use isocyanates having similar reactivity. Dimeric monoisocyanates and polyisocyanates can also be used such as, for example, 3,3'-diisocyanato-4,4'-dimethyl diphenyl uretdione.

Compounds which may be used as catalysts are the N-alkali metal and N-alkaline earth metal compounds of primary and secondary aliphatic, araliphatic, aromatic amines and heterocyclic amines. Amines which may be employed are, for example, methylamine, N-butylamine, tert.-butylamine, methoxy-n-propylamine, oleylamine, diethylamine, di-n-butylamine, diisobutylamine, di-cyclohexylamine, N-methylstearylamine, benzylamine, ethylbenzylamine, dibenzylamine, phenylbenzylamine, aniline, naphthylamine, 3-N-ethylaminotoluene, toluidine, methylaniline, N-isobutylaniline, diphenylamine, N-methylanisidine, and also pyrrolidine, piperidine, 1,2,3,4-tetrahydroquinoline, pyrrole, indole, 2-methylindole, 2,3-dimethylindole, 5-methoxy-2,3-dimethylindole, carbazole, 3,6-dinitrocarbazole, N,N'-dimethylethylenediamine and N,N'-dimethyl-p-phenylenediamine.

N-alkali metal and N-alkaline earth metal compounds of carboxylic acid amides can also be used in accordance with the process of the invention. These include aliphatic and aromatic carboxylic acid amides and also such cyclic acid amides as imides and lactams. The following compounds are examples of compounds suitable for the production of such N-metal compounds: acetamide, trimethylacetamide, myristinic acid amide, stearoyl amide, N-methylacetamide, phenylacetamide, benzamide, N-alkyl benzamides, succinimide, tetrapropenyl succinimide, phthalimide, pyrrolidone, butyrolactam, caprolactam, phthalimidine and saccharine.

Any alkali or alkaline earth metal may be combined with the amines or carboxylic acid amides such as, for example, lithium, sodium, potassium, magnesium, barium, and calcium, with the preferred metals being lithium, sodium, potassium and calcium.

The polymerization conditions are dependent upon the reactivity of the isocyanates to be polymerized, the activity of the metal compound and on the nature and quantity of the solvent which is optionally present. The polymerization may be performed at a temperature from about −40° C. to about 200° C., preferably at a temperature below 100° C. However, in some circumstances it is advantageous to use higher temperatures in the formation of polymeric polyisocyanates. The isocyanates may be polymerized at atmospheric pressure or above. If the polymerization is carried out in the presence of a protective gas atmosphere, such as nitrogen or carbon dioxide, the color of the final product will be considerably improved over that prepared in the presence of an oxygen atmosphere.

The polymerization of the monomeric isocyanates to form high molecular weight polyisocyanates may be carried out in the presence or absence of inert organic solvents. These solvents should not contain any hydrogen atoms or other groups which are reactive with the isocyanate groups. Examples of solvents which may be used include esters of aliphatic or aromatic carboxylic acids, aliphatic or cyclic ethers, ketones or aliphatic or aromatic halogenated hydrocarbons. Examples of aliphatic and aromatic esters are butyl acetate, isoamyl acetate, hexyl acetate, ethyl butyrate, amyl butyrate, ethyl nonylate, ethyl laurate, octyl acetate and the like. Examples of aliphatic and cyclic ethers are methyl ether, methylethyl ether, methylpropyl ether, ethylpropyl ether, ethylbutyl ether, isopropyl ether, isoamyl ether, methylisopropyl ether, methylisobutyl ether and dioxane. Examples of aliphatic or aromatic halogenated hydrocarbons are monochlorobenzene, di-chlorobenzene, cholortoluene, chloroxylene, methylene chloride, chloroform, carbon tetrachloride, and the like. Examples of ketones which may be used as solvents are dimethyl ketone, diethyl ketone, di-n-propyl ketone, di-butyl ketone, di-amyl ketone, di-hexylketone, di-octyl ketone, methyl ethyl ketone, methyl butyl ketone, methyl hexyl ketone, ethyl butyl ketone, methyl decyl ketone and the like.

By the process of this invention, organic isocyanates may be conveniently polymerized without the use of poisonous or malodorous or otherwise objectionable catalysts by which the activity of the catalyst is such that there is little difficulty in controlling the exothermic polymerization. The amount of catalyst may be varied to control the rate of polymerization but will, in general, be between 0.001 to about 10 percent by weight of the isocyanate, preferably from about 0.01 to about 5 percent and more preferably from about 0.01 to about 2 percent is used at room temperature.

Another advantage of this invention is that the polymerization may be instantly stopped if desired by the addition to the polymerization medium of organic or inorganic acids or acid halides in substantially equal molar amounts with respect to the catalyst.

In addition, it was found that the polymerization efficiency of these novel catalysts is greatly enhanced by using solvents which contain reactive carbonyl groups. The reactivity of N-metal compounds of strongly basic amines in the presence of carbonyl containing solvents is illustrated by adding 1.8 millimole of an ethereal lithium diethyl amide solution to 3 milliliters of the suitable solvent and mixed with 100 grams of 2,4-diisocyanato-toluylene. The isocyanate content of the reaction mitxure is determined after 15 minutes. If polymerization occurs as indicated by the plus (+), the reaction is stopped after reaching the maximum temperature. An amount of hydrogen chloride equivalent to the catalyst is dissolved in ethyl acetate and added to the polymerization mixture to inhibit further polymerization. The NCO content of the resin is then determined. The reactivity of the combination of N-metal compounds and the solvent containing carbonyl groups is shown in the following table:

| Catalyst | $T_{max}$ (° C.) | NCO (percent) |
|---|---|---|
| $(C_2H_5)_2$NLi | 43 | 34 |
| $(C_2H_5)_2$NLi+acetophenone | 85 | 26 |
| $(C_2H_5)_2$NLi+ethyl acetate (+) | 144 | 21.5 |
| $(C_2H_5)_2$NLi+benzaldehyde (+) | 164 | 16.7 |
| $(C_2H_5)_2$NLi+methyl benzoate (+) | 170 | 15.9 |
| $(C_2H_5)_2$NLi+dimethyl diethylmalonate (+) | 185 | 12.5 |

The efficacy of the catalysts used according to the invention is improved by the presence of N-substituted carbamic acid esters, which are either added as such or can be produced in situ by addition of an alcohol. Examples of N-substituted carbamic acid esters are described in U.S. Patent 2,954,365 as well as their preparation in situ.

By this process, solutions of polyisocyanates with an isocyanurate structure of relatively high molecular weight dissolved in monomeric isocyanates are obtained. The latter can be removed by distillaton under reduced pressure or by extraction with solvents, which are selective for the isocyanates but do not dissolve the polymerization products.

The invention is further illustrated but is not intended to be limited by the following examples in which all parts and percentages are by weight unless otherwise specified.

*Example 1*

About .56 part of an ethereal lithium diethylamide solution, which contains about 16.4 parts of lithium diethylamide per 70.8 parts, are mixed with about 2.7 parts of ethyl acetate and added to a solution of about 50 parts of 2,4-diisocyanatotoluene in about 50 parts of ethyl acetate. The temperature is kept below about 30° C. by cooling. After approximately 2 hours, the polymerization is stopped by adding an equivalent quantity of hydrogen chloride in ethyl acetate. A yellowish viscous solution is obtained which has an NCO-content of about 8.5 percent with the infra-red spectrum showing the characteristic bands of an isocyanurate.

Example 2

About 1.9 parts of about a 1.6 percent solution of potassium diphenylamine in dimethylformamide are added to about 100 parts of 2,4-diisocyanatotoluene. The temperature increased to about 65° C. After about 10 minutes, the NCO-content of the pale yellowish reaction mixture had fallen to about 29.8 percent.

Example 3

About 1.34 parts of about a 3.3 percent solution of potassium carbazole in dimethylformamide are added to about 100 parts of 2,4-diisocyanatotoluene. Over a period of about 3 hours, the 2,4-diisocyanatotoluene polymerized with an appreciable increase in temperature to form a yellowish, brittle resin with an NCO-content of about 21.5 percent which is readily soluble in acetone, ethyl acetate and methylene chloride.

Example 4

About 2.9 parts of about a 5 percent solution of N-potassium-n-propyl acetamide in dimethyl sulphoxide are added to about 100 parts of 2,6-diisocyanatotoluene in about 50 parts of ethyl acetate. The NCO-content of the reaction mixture, which immediately becomes hot, fell within 2 hours to about 14.3 percent. A yellowish, highly viscous liquid is obtained.

Example 5

About 11.5 parts of about a 2 percent solution of potassium phthalimide in dimethyl sulphoxide are added to about 50 parts of m-xylylene diisocyanate and about 50 parts of ethyl acetate. After heating for about 5 hours at 60° C., the NCO-content of the almost colorless reaction mixture had fallen to about 9.2 percent.

Example 6

About 300 parts of 1,6-diisocyanato hexane are reacted with about 23 parts of about a 6.6 percent solution of potassium phthalimide in dimethyl sulphoxide. The reaction temperature is kept at about 40° C. by cooling. After a reaction period of approximately 2 hours, the NCO-content of the solution had fallen to about 37.0 percent. Polymerization is now stopped by adding an equivalent quantity of hydrogen chloride in ethyl acetate, and the excess 1,6-diisocyanato hexane is distilled off under high vacuum.

The residue comprises about 110 parts of a highly viscous liquid, which is free from monomeric 1,6-diisocyanato hexane and has an NCO-content of about 20.5 percent. The infra-red spectrum shows the characteristic bands for an isocyanurate.

Example 7

About 5.75 parts of about a 0.5 percent solution of potassium benzamide in dimethyl sulphoxide are added dropwise to about 50 parts of 4,4'-diisocyanatodiphenyl methane in about 50 parts of ethyl acetate. After 1 hour, the clear viscous liquid contains about 6.2 percent of NCO-groups, in comparison with an NCO-content of about 16.5 percent in the original solution. The infra-red spectrum shows the characteristic bands for an isocyanurate.

Example 8

About 1.15 parts of about a 5.3 percent solution of N-potassium-n-propyl acetamide in dimethyl sulphoxide is added to about 50 parts of 1-chloro-2,4-diisocyanato-benzene in about 50 parts of ethyl acetate. After about 4 hours, a pale yellowish viscous liquid having an NCO-content of about 6.7 percent is obtained. The infra-red spectrum shows the characteristic isocyanurate bands at 5.9 and 7.05 microns.

Example 9

If about 5.17 parts of a 1 percent solution of N-potassium acetamide in dimethyl sulphoxide are added to a mixture of about 30 parts of 3,5-diisocyanatotoluene and about 40 parts of ethyl acetate, the NCO-content of the reaction mixture falls within about 4 hours to about 6.5 percent.

Example 10

About 23 parts of about a 1.5 percent solution of sodium dibenzamide in dimethyl sulphoxide are added dropwise to about 50 parts of 1-ethoxy-2,4-diisocyanato benzene in about 80 parts of ethyl acetate. The temperature is kept below about 30° C. by cooling. After about 3 hours, the viscous liquid contains about 5.3 percent of NCO-groups, as compared with an NCO-content of about 13.6 percent in the original solution.

Example 11

About 5.75 parts of a 4.3 percent solution of lithium carbazole in dimethyl sulphoxide are added to about 30 parts of 1-methoxy-2,4-diisocyanato-benzene in about 70 parts of ethyl acetate. The temperature is kept below about 35° C. by cooling. After about 2 hours, the viscous solution shows an NCO-content of about 3.9 percent.

Example 12

About 0.58 part of about a 5.2 percent solution of N-potassium-n-propylacetamide in dimethyl sulphoxide is added at room temperature to about 100 parts of 2,4-diisocyanato toluene. The temperature of the reaction mixture rises spontaneously to about 45° C. within about 15 minutes even with external cooling by means of a water bath kept at about 25° C. The NCO-content after the reaction is about 35.0 percent. If, however, about 0.80 part of methyl alcohol is added to the mixture before addition of the catalyst, the maximum temperature is about 60° C. and the NCO-content is about 30.0 percent. The infra-red spectra in both experiments show the characteristic bands of an isocyanurate.

The polymerized isocyanates containing an isocyanurate structure have the advantage of low toxicity due to the absence of volatile monomers and may be used in place of or in addition to isocyanates for a wide variety of purposes such as, for example, as adhesives curing agents for resins and for the manufacture of polyurethane solid or cellular articles. These isocyanates may be employed as cross-linking agents in the production of lacquers, adhesives, homogeneous or porous plastics. These products can also be used as substances for splitting off isocyanates, e.g. the known phenol adducts.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A process for the preparation of polyisocyanates having an isocyanurate structure which comprises polymerizing organic isocyanates in the presence of a catalyst selected from the group consisting of N-alkali metal amines, N-alkali metal carboxylic acid amides, N-alkali earth metal amines, and N-alkaline earth metal carboxylic acid amides.

2. The process of claim 1 wherein the organic isocyanates are mixtures of organic polyisocyanates and organic monoisocyanates.

3. The process of claim 1 wherein the polymerization is conducted at temperatures between about −40° C. and +200° C.

4. The process of claim 1 wherein the polymerization is conducted at room temperature.

5. The process of claim 1 wherein the polymerization is conducted in the presence of an inert organic solvent.

6. The process of claim 1 wherein the catalyst is present in an amount sufficient to promote polymerization.

7. The process of claim 1 wherein the catalyst is present in an amount of from about 0.001 percent to about 10 percent by weight of the isocyanate.

8. The process of claim 1 wherein the polymerization is conducted in the presence of an inert organic solvent having at least one reactive carbonyl group.

9. A process for the preparation of polyisocyanates having an isocyanurate structure which comprises contacting an organic diisocyanate at room temperature with a sufficient amount of N-alkali metal carboxylic acid amide to polymerize the diisocyanate and form polyisocyanates containing an isocyanurate structure.

10. The process of claim 9 wherein the alkali metal is potassium.

11. The process of claim 9 wherein the amide is propylacetamide.

12. The process of claim 9 wherein the reaction is conducted in the presence of an inert organic solvent.

13. A process for the preparation of polyisocyanates having an isocyanuate structure which comprises polymerizing organic isocyanates in the presence of a catalyst selected from the group consisting of N-alkali metal amines, N-alkali metal carboxylic acid amides, N-alkaline earth metal amines and N-alkaline earth metal carboxylic acid amides, and thereafter terminating the polymerization by the addition thereto of a polymerization inhibitor in amount substantially equivalent to the amount of catalyst.

14. The process of claim 13 wherein the polymerization inhibitor is selected from the group consisting of acids and acid halides.

15. A process for the preparation of polyisocyanates having an isocyanurate structure which comprises polymerizing organic isocyanates in the presence of N-substituted carbamic acid ester and a catalyst selected from the group consisting of N-alkali metal amines, N-alkali metal carboxylic acid amides, N-alkaline earth metal amines and N-alkaline earth metal carboxylic acid amides.

16. The process of claim 15 wherein the polymerization is conducted in the presence of an inert organic solvent.

17. The process of claim 15 wherein the polymerization is conducted in the presence of an inert organic solvent having at least one reactive carbonyl group.

References Cited

UNITED STATES PATENTS

| | | | |
|---|---|---|---|
| 2,954,365 | 9/1960 | Windemuth et al. | 260—77.5 |
| 2,965,614 | 12/1960 | Shashoua | 260—77.5 |
| 3,108,100 | 10/1963 | Tate et al. | 260—248 |
| 3,180,846 | 4/1965 | Haggis | 260—77.5 X |
| 3,259,625 | 7/1966 | Ugi et al. | 260—248 |

WALTER A. MODANCE, *Primary Examiner.*

JOHN M. FORD, *Assistant Examiner.*